(12) United States Patent
Lindoff et al.

(10) Patent No.: US 10,178,599 B2
(45) Date of Patent: Jan. 8, 2019

(54) METHOD AND APPARATUS FOR DATA PACKET TRANSMISSION

(71) Applicant: Telefonaktiebolaget LM Ericsson (publ), Stockholm (SE)

(72) Inventors: Bengt Lindoff, Bjarred (SE); Per Persson, Sodra Sandby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 98 days.

(21) Appl. No.: 15/104,586

(22) PCT Filed: Dec. 16, 2013

(86) PCT No.: PCT/EP2013/076648
§ 371 (c)(1),
(2) Date: Jun. 15, 2016

(87) PCT Pub. No.: WO2015/090348
PCT Pub. Date: Jun. 25, 2015

(65) Prior Publication Data
US 2017/0019830 A1 Jan. 19, 2017

(51) Int. Cl.
H04W 40/08 (2009.01)
H04W 40/22 (2009.01)
H04L 12/707 (2013.01)

(52) U.S. Cl.
CPC .......... H04W 40/08 (2013.01); H04L 45/22 (2013.01); H04W 40/22 (2013.01); Y02D 70/00 (2018.01);
(Continued)

(58) Field of Classification Search
CPC .................. H04W 40/08; H04L 45/22
(Continued)

(56) References Cited

U.S. PATENT DOCUMENTS 7,106,703 B1    9/2006 Belcea
2004/0242154 A1* 12/2004 Takeda ................. H04B 7/2606
                                                              455/16

(Continued)

FOREIGN PATENT DOCUMENTS

CN    102781063 A    11/2012
CN    102802175 A    11/2012

(Continued)

OTHER PUBLICATIONS

PCT International Search Report, dated Sep. 15, 2014, in connection with International Application No. PCT/EP2013/076648, all pages.

(Continued)

Primary Examiner — Peter G Solinsky
(74) Attorney, Agent, or Firm — Sage Patent Group

(57) ABSTRACT

The proposed technology generally relates to sending a data packet from a first node to a second node, wherein there is a direct link to the second node from the first node. The method comprises the steps of: determining a first power metric associated with transmitting the data packet from the first node to the second node on the direct link; when the determined first power metric is above a first power level then determining a first set of aggregation nodes, being within reach of the first node, wherein each aggregation node in the set is comprised in a respective alternative transmission path from the first node to the second node; for each aggregation node in the first set determining a second power metric associated with transmitting the data packet to from the first node to the second node via the aggregation node; selecting a transmission path for sending the data packet from the first node to the second node based on a comparison of the first power metric and the second power metric(s) and sending the packet on the selected transmission path. One aspect of the proposed technology relates to a method and ending a data packet from the first node to a (Continued)

second node as well as a corresponding device and computer program.

17 Claims, 6 Drawing Sheets

(52) U.S. Cl.
CPC ...... *Y02D 70/1224* (2018.01); *Y02D 70/1262* (2018.01); *Y02D 70/142* (2018.01); *Y02D 70/144* (2018.01); *Y02D 70/21* (2018.01); *Y02D 70/22* (2018.01); *Y02D 70/324* (2018.01); *Y02D 70/39* (2018.01)

(58) Field of Classification Search
USPC .......................................................... 370/338
See application file for complete search history.

(56) References Cited

U.S. PATENT DOCUMENTS

| | | | |
|---|---|---|---|
| 2005/0094588 A1* | 5/2005 | Wentink | H04W 40/10 370/315 |
| 2005/0111428 A1 | 5/2005 | Orlik et al. | |
| 2007/0055472 A1 | 3/2007 | O'Toole | |
| 2008/0025269 A1 | 1/2008 | Gupta et al. | |
| 2009/0010189 A1 | 1/2009 | Nagra et al. | |
| 2010/0150262 A1* | 6/2010 | Kim | H04L 27/361 375/286 |
| 2011/0116402 A1* | 5/2011 | Kimura | H04L 45/34 370/252 |
| 2011/0241782 A1* | 10/2011 | Clifton | H03F 1/0222 330/295 |
| 2013/0107868 A1* | 5/2013 | Sadek | H04W 52/244 370/338 |
| 2013/0322458 A1* | 12/2013 | Nagumo | H04L 45/28 370/401 |

FOREIGN PATENT DOCUMENTS

| | | |
|---|---|---|
| EP | 1573976 B1 | 7/2008 |
| EP | 2323440 A1 | 5/2011 |
| EP | 2323440 B1 | 1/2013 |
| EP | 2549804 A1 | 1/2013 |
| EP | 2615776 A1 | 7/2013 |
| GB | 2468065 B | 12/2010 |
| KR | 20120068427 A | 6/2012 |
| WO | 2009112937 A1 | 9/2009 |

OTHER PUBLICATIONS

PCT Written Opinion, dated Sep. 15, 2014, in connection with International Application No. PCT/EP2013/076648, all pages.

\* cited by examiner

METHOD AND APPARATUS FOR DATA PACKET TRANSMISSION

TECHNICAL FIELD

The proposed technology relates to wireless networks and in particular it relates to sending a data packet from the first node to a second node, wherein there is a direct link to the second node from the first node. The proposed technology also relates to a first node for implementing the method and to a corresponding computer program.

BACKGROUND

Future communication systems are expected to, in many situations, be based on ad-hoc networks instead of, or in combination with, today's cellular communication approach with a central node, to which every device within reach of the central node should transmit the data. The development within wireless networking is going towards solutions where different radio access technologies, RAT, are supposed to be more and more integrated. As an example, capillary networks are already today used to connect sensors, meaning that within an area there are several sensors or devices connected with each other, typically using a Radio Access Technology utilizing unlicensed spectrum like Bluetooth or WLAN. One or several of the sensors or devices may also be connected to one or a few nodes that act as gateways to other networks or to the internet. In an example implementation, the communication to other networks or to the internet is made over another Radio Access Technology used in licensed band (LTE for instance), then the gateway or relay nodes are devices having cellular communication capabilities.

In addition, the amount of data transmitted over wireless networks is constantly increasing. Machine to machine, M2M, communication over mobile and wireless networks is expected to become increasingly important in the future. An M2M device may be mounted at places with severely low accessibility in tough environments limiting occasion for battery exchanges and re-charging. Hence, the need to save power is still highly relevant.

There is prior art disclosing methods for addressing power consumption in ad hoc networks. For example European Patent EP1573976 B1 discloses a method which also makes sure that no single node gets used too often and thus gets its battery drained. However, this solution is related to smoothing the power rather than minimizing the power usage.

There are also routing protocols directed to providing solutions for "routing" in ad hoc or mesh networks. For example, published European patent application EP 2 323 440 A1 takes into account the power consumption for each route when selecting a route in a meshed network.

However, these solutions are not optimised for devices capable of communicating over several radio access technologies in an environment with several integrated communication technologies. Hence, there is still a need for further simple transmission methods and strategies for transmitting a data packet between devices in a wireless network.

SUMMARY

The present disclosure proposes a general method for transmitting a data packet between two devices in wireless networks. The disclosure solves a problem of providing a power and performance efficient packet transmission between the two devices; reducing the overall power consumption in the network. The basic concept of the disclosure covers the idea that, when transmitting non-delay sensitive data packets, the transmitting node relays the packet via an aggregating node e.g. using a second RAT or frequency spectrum when this is determined to be more power and performance efficient.

According to one aspect of the disclosure, it provides for a method, performed in a first node in a wireless network comprising a number of nodes wirelessly connected to each other, of sending a data packet from the first node to a second node, wherein there is a direct link to the second node from the first node. The method comprises determining a first power metric, P1, associated with transmitting the data packet from the first node to the second node on the direct link. When the determined first power metric, P1, is above a first power level, then the method comprises determining a first set of aggregation nodes, being within reach of the first node, wherein each aggregation node in the set is comprised in a respective alternative transmission path from the first node to the second node and for each aggregation node in the first set determining a second power metric associated with transmitting the data packet to from the first node to the second node via the aggregation node. Finally the method comprises selecting a transmission path for sending the data packet from the first node to the second node based on a comparison of the first power metric and the second power metric(s), and sending the packet on the selected transmission path. The proposed method gives a simple low power transmission strategy for transmission of data packet from a first node to a second node in a capillary network, because relaying data may in some cases also reduce the total system power usage. Longer use time as well as lower interference levels than if all communication is sent direct from the first node to the second node is achieved as well.

According to one aspect, the direct link uses a first radio access technology and wherein nodes in the second set use a second radio access technology which is different from the first radio access technology. Relaying data to a third node using another RAT may be more power efficient than direct transmission of data to the destination node using a first RAT. This implies that an overlapping meshed network may be used to reduce power and decrease interference.

According to one aspect, the first RAT uses a coordinated transmission scheme. According to one aspect, the first RAT is one of LTE, HSPA, GPRS/EDGE. According to another aspect, the second RAT uses a contention based transmission scheme like Bluetooth or WLAN.

According to one aspect, the first or second power metric is output power or total energy needed for the first or second node to transmit the data packet. By using output power to control the transmission path, the total power used may be minimized.

According to one aspect, the second power metric, P2, associated with an aggregation node in the first set is the total output power needed or the total energy needed for the aggregation node, or for at least the first node and the aggregation node, to transmit the data packet to the second node via the aggregation node. This is a simple solution, wherein only easily available parameters i.e. the power or energy needed by the first node and/or the aggregation node, are used for making the selection.

According to one aspect, the second power metric, P2, associated with an aggregation node is the total output power needed or the total energy needed for all nodes comprised in the path between the first node and the second node when transmitting the data packet to the second node via the aggregation node. By considering all nodes, the total power consumption is controlled.

According to one aspect, the step of selecting a transmission path further comprises only selecting transmission paths wherein each node in the transmission path are positioned beyond a minimum distance from all other nodes in the transmission path. By selecting nodes wherein the first power metric, P1, is above a value but wherein the nodes are still not too close to each other, the power amplifiers of the transmitters of the nodes in the transmission path may operate within the range wherein the amplification is optimal.

According to one aspect, the step of selecting a transmission path further comprises determining a number of aggregation nodes in a transmission path from the first to the second node and selecting a transmission path based on the number of links in the transmission path. Then, long paths, which may cause long delays, may be avoided.

According to one aspect, the method of sending a data packet further comprises, for each aggregation node in the first set, determining the number of data packets in at least one transmission buffer associated with transmitting the data packet to from the first node to the second node via the aggregation node. By selecting nodes wherein the transmission buffers are not empty or above a level, then long waiting times are avoided. In principle this implies directing data on the same path as much as possible, which is power efficient.

According to one aspect, the method of sending a data packet according to any of the preceding claims, wherein first level corresponds to a "knee point" of a transmission power for a power amplifier. Hence, operation range of the power amplifier is optimized.

According to another aspect the disclosure relates to a first node in a wireless network comprising a number of nodes wirelessly connected to each other, configured for sending a data packet from the first node to a second node, wherein there is a direct link to the second node from the first node. The first node comprises a communication interface and a processing circuitry.

The communication interface is configured for wireless communication with other nodes in the wireless network. The processing circuitry is configured to determine a first power metric, P1, associated with transmitting the data packet from the first node to the second node on the direct link, and when the determined first power metric, P1, is above a first power level, then determine a first set of aggregation nodes, being within reach of the first node, wherein each aggregation node in the set comprised in a respective alternative transmission path from the first node to the second node. The processing circuitry is further configured to, for each aggregation node in the first set determine a second power metric, P2, associated with transmitting the data packet to from the first node to the second node via the aggregation node, select a transmission path for sending the data packet from the first node to the second node based on a comparison of the first power metric, P1, and the second power metric(s), P2, and send the packet on the selected transmission path.

According to one aspect, the communication interface is adapted to communicate directly with the second node using a first radio access technology and to communicate with the aggregation nodes of the second set of nodes using a second radio access technology which is different from the first radio access technology.

According to another aspect the disclosure relates to a computer program, comprising computer readable code which, when run on a node in a contention based communication system, causes the node to perform any of the aspects of the method described above.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Figure 1:
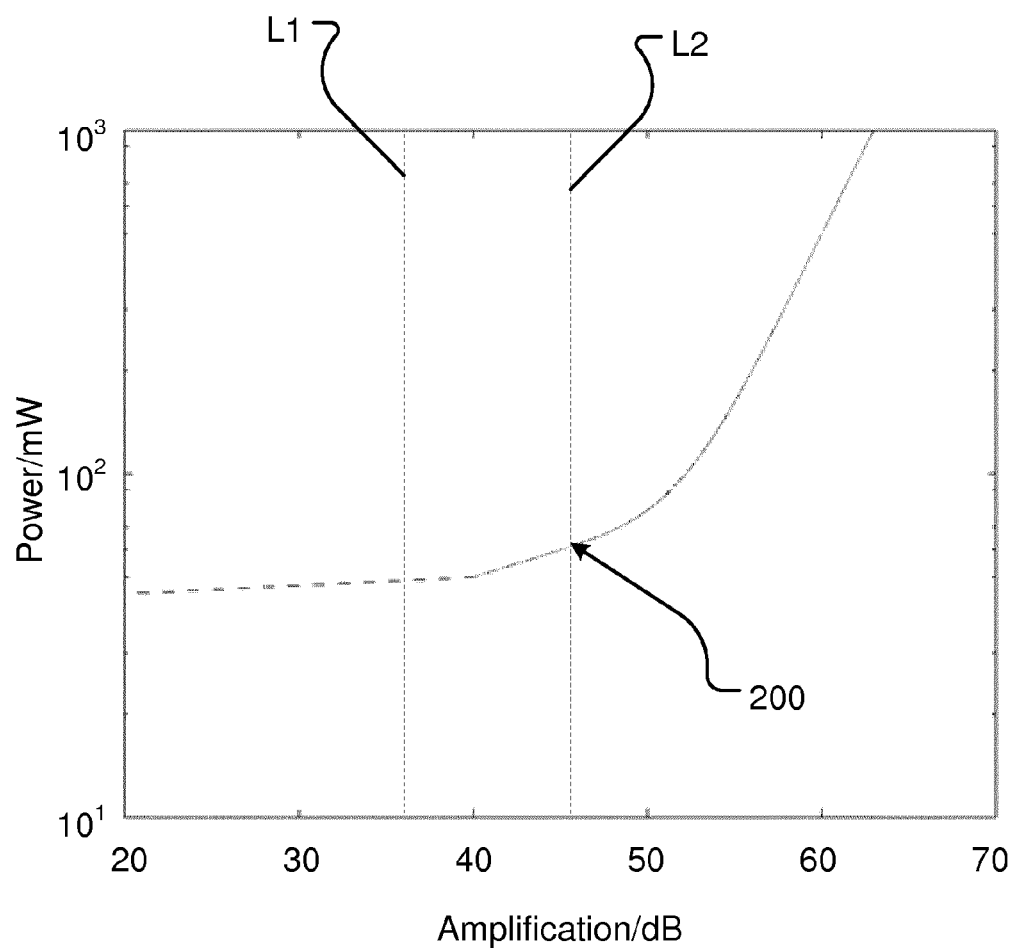
FIG. 1 shows a principle diagram illustrating power use for a machine type device as a function of the amplification.

The inventors have realized that transmissions directly from a first node to a second node may, due to e.g. the nonlinear relationship between distance and amplifier power consumption implies unnecessary power drain in device A. FIG. 1 shows a principle sketch over consumed battery power for a machine type device as a function of the amplification where 63 dB corresponds to output power of 23 dB. Note that, below a "knee point" 200 at about 45 dB the power needed for transmission is substantially flat. Hence, the disclosure proposes to keep the transmission power below the knee point. Hence, much lower power than the "knee point" will not give any substantial advantages with regards to power consumption for the node/device. Hence, the preferred area of operation is e.g. in a zone defined by a lower and a higher power level, here referred to as a first power level, L1, and a second power level, L2. One reason for the "knee" effect is that other parts of the transmitter starts to dominate over the power amplifier. Hence the flat part is basically the "on power" for the entire transmitter chain, while the exponential behavior is the power needed by the power amplifier.

Figure 2:
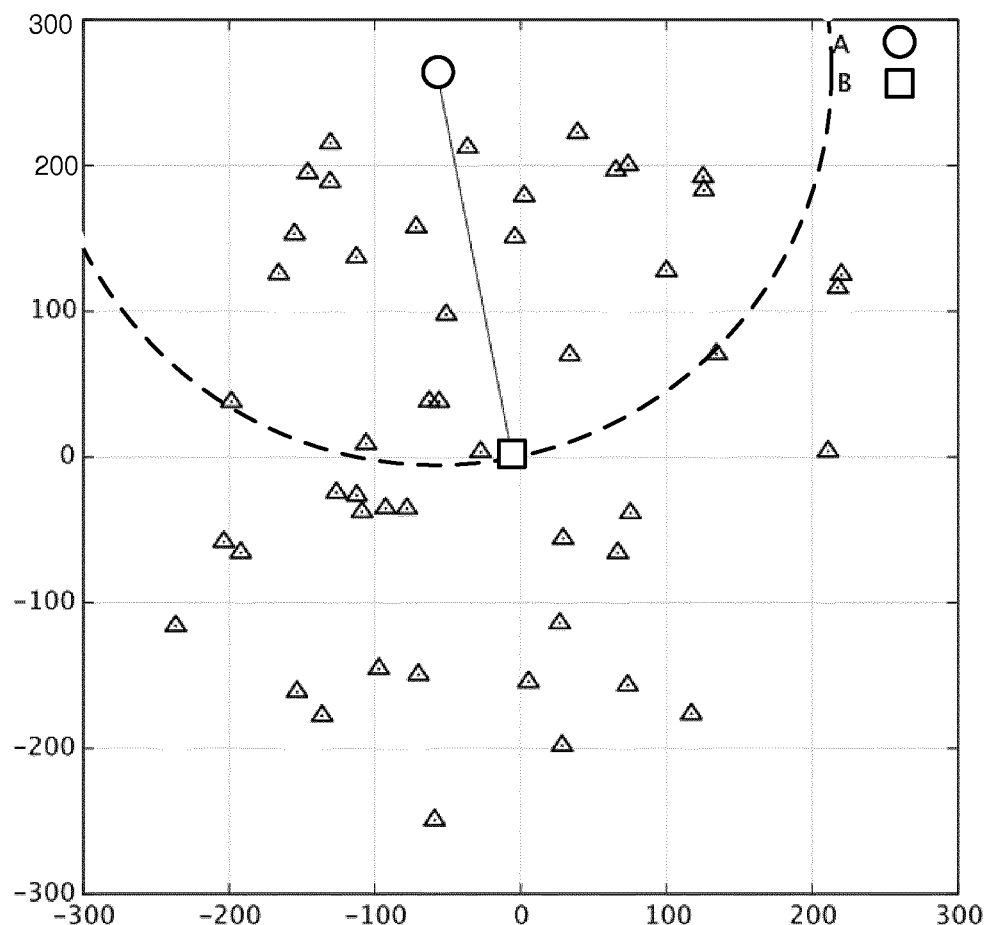
FIG. 2 illustrates total power and interference for direct transmission from a first node to a second node.

Furthermore, assuming data to be transmitted from a first node to a second node using a radio access technique, RAT, optimized for use in unlicensed band and assuming direct transmission to the second node from the first node regardless of distance between the nodes may introduce severe interference on other devices within the distance of the first node and the second node illustrated by the dashed line in FIG. 2. Since transmission is not be coordinated collision may occur, further degrading the system In prior art cellular systems, this problem is mitigated by the fact that there is a well-defined node having connection to the NW (base station, eNode B, node B etc.). Then, all traffic from a particular device needs to go directly to this central node, wherein the central node has control over all the communication in a cell and may optimize the transmission for avoiding interference. In Ad-hoc networks, there is not always a central node controlling the entire network. Hence, in distributed networks or networks using a combination of scheduled and contention based access techniques, it has turned out that other approaches are required in order to optimize the performance of the network in terms of through put and power.

Figure 3:
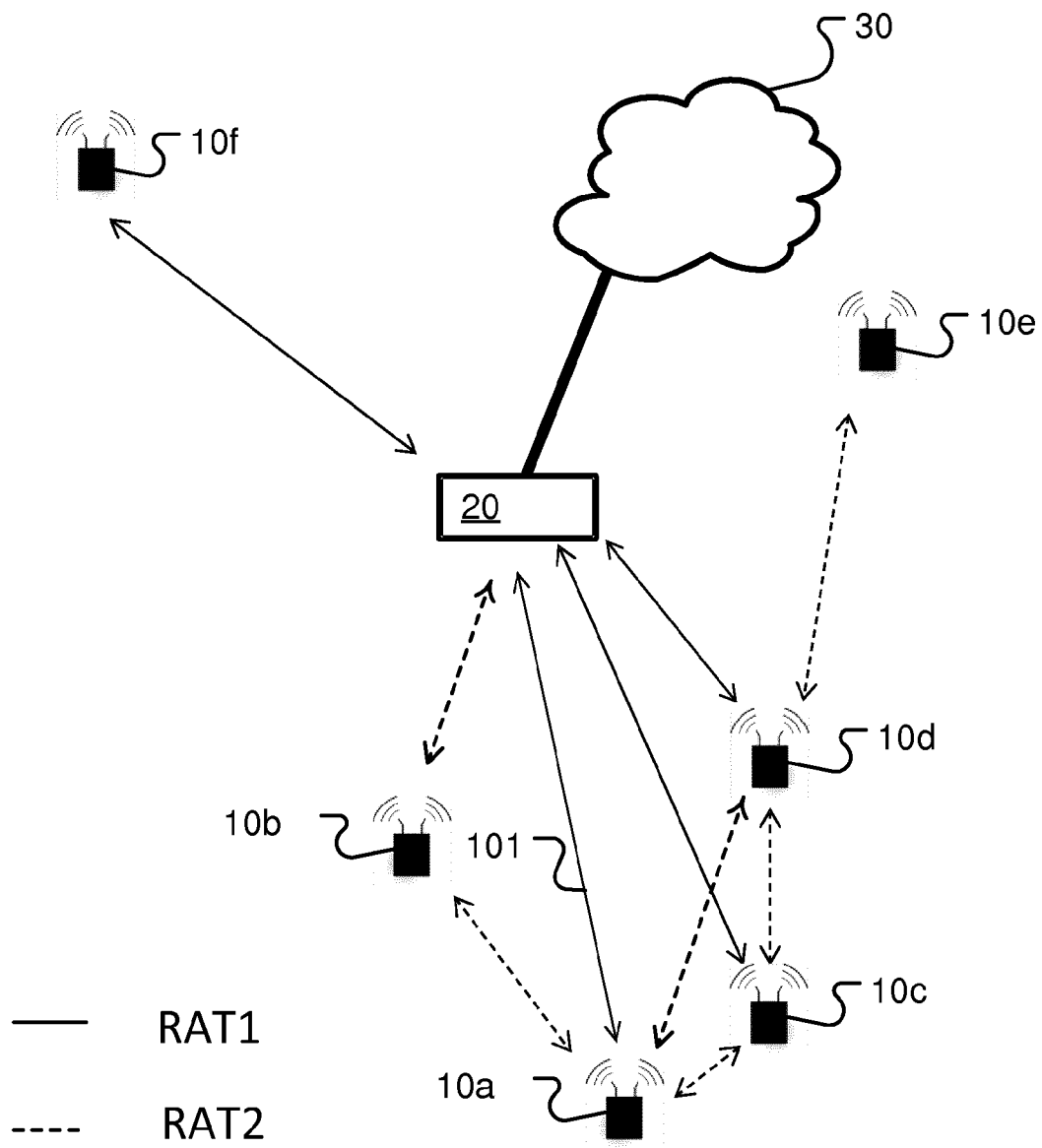
FIG. 3 illustrates an example of Capillary Network.

FIG. 3 shows an example of a capillary network. Here four nodes 10a, 10c, 10d and 10f support a first Radio Access Technology, RAT, and a second RAT while two nodes 10b and 10e only support the second RAT. The second RAT is e.g. BT. A first wireless device 10a that wants to send a packet to a gateway node (e.g. a base station) 20 need to transmit with sufficient power to be able to reach the central NW node, implying very high energy consumption needed when device is far from the NW node and therefore need to transmit at high power. This is due to the path loss that is approximately proportional to the cube of the distance in many practical situations.

The basic concept of the disclosure covers the idea that, when transmitting non-delay sensitive data packets, the device/node 10a, to be transmitting a data packet to a gateway node 20 within reach of the node 10a the possible communication, between the first node 10a and the gateway node 20 using a first RAT (e.g. LTE/HSPA) determines whether it is more power efficient to relay the packet via an adjacent node that may act as an aggregation node or whether it is sufficiently low power to transmit the packet directly. The aggregation node is possibly using a second RAT and frequency spectrum (e.g. ISM, and Bluetooth).

In this application the originating node is referred to as the first node and the destination is referred to as the second node 20. The direct link or transmission path 101 between the first node and the second node is a path without intermediate nodes.

An alternative transmission path involves one or more intermediate nodes. The alternative transmission path is independent of Radio Access Technology, RAT. An aggregation node is the first intermediate node in an alternative transmission path. Thus, the aggregation node is "within reach" or "within coverage" of the first node.

Hence, in FIG. 3 nodes 10b, 10c and 10d are possible aggregation nodes when transmitting data from wireless device 10, being the first node, to base station 20, being the second node. In case of a multihop connection, several intermediate nodes are involved. However, each node, except the destination node, may be regarded as a first node operating with a logic according to the disclosure.

Figure 4:
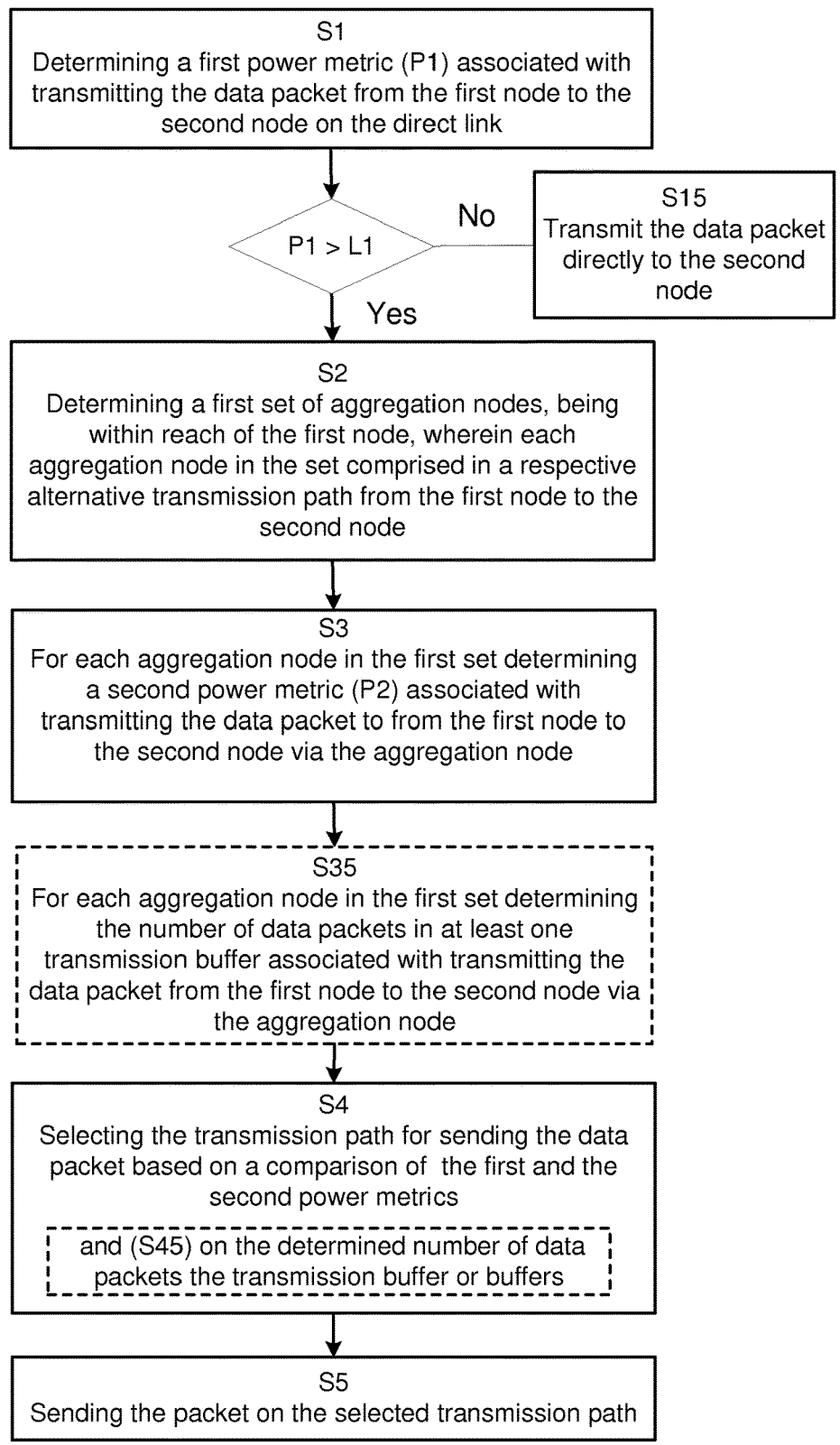
FIG. 4 is a flow chart illustrating the proposed method for for sending a data packet from the first node to a second node according to an exemplary embodiment of the present disclosure.

FIG. 4 is a flow chart illustrating the proposed method of sending a data packet from a first node 10a to a second node 20, according to an exemplary embodiment of the present disclosure. The method is typically initiated when a first node 10a, e.g. a wireless device, determines a need to transfer a packet to a gateway node 20. The first node is e.g. a wireless device like a Smartphone or an M2M device that is about to transfer a data packet to a gateway node 20, being e.g. a base station or relay node, for further transmission via a core network.

Hence, FIG. 4 discloses a method, performed in a first node 10a in a wireless network comprising a number of nodes 10 wirelessly connected to each other, of sending a data packet from the first node 10a to a second node 20, wherein there is a direct link 101 to the second node from the first node.

The first step S1 comprises determining a first power metric, P1, associated with transmitting the data packet from the first node to the second node on the direct link. The first node determines e.g. the power or energy needed, P1, for transmission the data packet directly to the gateway node using a first RAT and a first frequency band.

Hence, the power metric is a measure or parameter associated with the power required for the transmission. The determination may be done by determining the received power level of pilot signals e.g. RSRP in LTE, received in the downlink (possible together with information about transmitted RSRP power level informed by the base station) and based on that and allocated UL resource the TX power can be determined, which is well known in the art.

When the determined first power metric, P1, is above a first power level L1, then the first node determines S2 a first set of aggregation nodes 10. The set of aggregate nodes, as used in the description, consists of the respective first intermediate nodes in different alternative transmission paths. If, for example, the first node determines if the direct transmission would cause the power amplifier of the transmitter of the first node to operate above the "knee point" 200 as described above in connection with FIG. 1, the alternative routes are investigated. The alternative routes may use one or several different radio access technologies. Hence, according to one aspect, the first level corresponds to a "knee point" of a transmission power for a power amplifier. Note that the "knee point" depends e.g. on the hardware and radio access protocol used. If the first power metric is below a metric, no further action is needed and the direct connection may be used as illustrated by step S15.

The alternative nodes are nodes being within reach of the first node 10a. The alternative nodes are comprised in a respective alternative transmission path from the first node 10a to the second node 20. Hence, this implies that the first node investigates alternatives to the direct transmission. For example in the network of FIG. 3, the set would comprise aggregation nodes 10b, 10c and 10d, which all could provide alternative routes from node 10a to node 20.

Then, for each aggregation node 10b, 10c, 10d in the first set, the first node determines S3 a second power metric, P2, associated with transmitting the data packet from the first node to the second node via the aggregation node 10b, 10c, 10d. The second power metric, P2, is a metric associated with transmitting the data packet from the first node to second node over an alternative transmission path. Each alternative transmission path comprises the first node 10a and one or more intermediate nodes. The intermediate node of each alternative path being connected to the first node is here referred to as the aggregation node, as explained above. Thus, a set of P2 values correspond to a set of alternative transmission paths or aggregation nodes. P2 may be associated only with the aggregation node and/or to other nodes in the chain, depending on the circumstances.

For example, an alternative path between the first node 10a and the second node 20 would comprise nodes 10c and 10d. In this path node 10c would be the aggregation node. Then, according to a first example, P2 is the estimated energy or power needed by the first node 10a for transmitting the data packet to the aggregation node 10c.

According to a second example, P2 is the estimated energy or power needed by the first node 10a for transmitting the data packet to the aggregation node 10c plus energy or power needed by aggregation node 10c for transmitting the data packet to the intermediate node 10d.

According to a third example, P2 is the total estimated energy or power needed by all nodes in the alternative transmission path. In this example that would be the total power or energy needed by nodes 10a, 10c and 10d.

The first and second power metric are e.g. output power or total energy needed to transmit the data packet. The second power metric is e.g. the power required for transmission from the first node to each node in the set. The second power metric may also be a total power of several links in the alternative transmission path, as further described below.

In the next step the first node selects S4 a transmission path for sending the data packet from the first node to the second node based on a comparison of the first power metric, P1, and the second power metric(s), P2. If P1 is sufficiently close to (or lower than) P2, the data packet may still be transmitted directly to the gateway. As an alternative it may be relayed via a determined aggregation node. Then one of the aggregation nodes is chosen as a target node for relaying the data packet e.g. using the second RAT and a second frequency band. The comparison may e.g. be made by calculating P2/P1 or P1-P2. Finally the first node sends S5 the packet on the selected transmission path.

Figure 5:
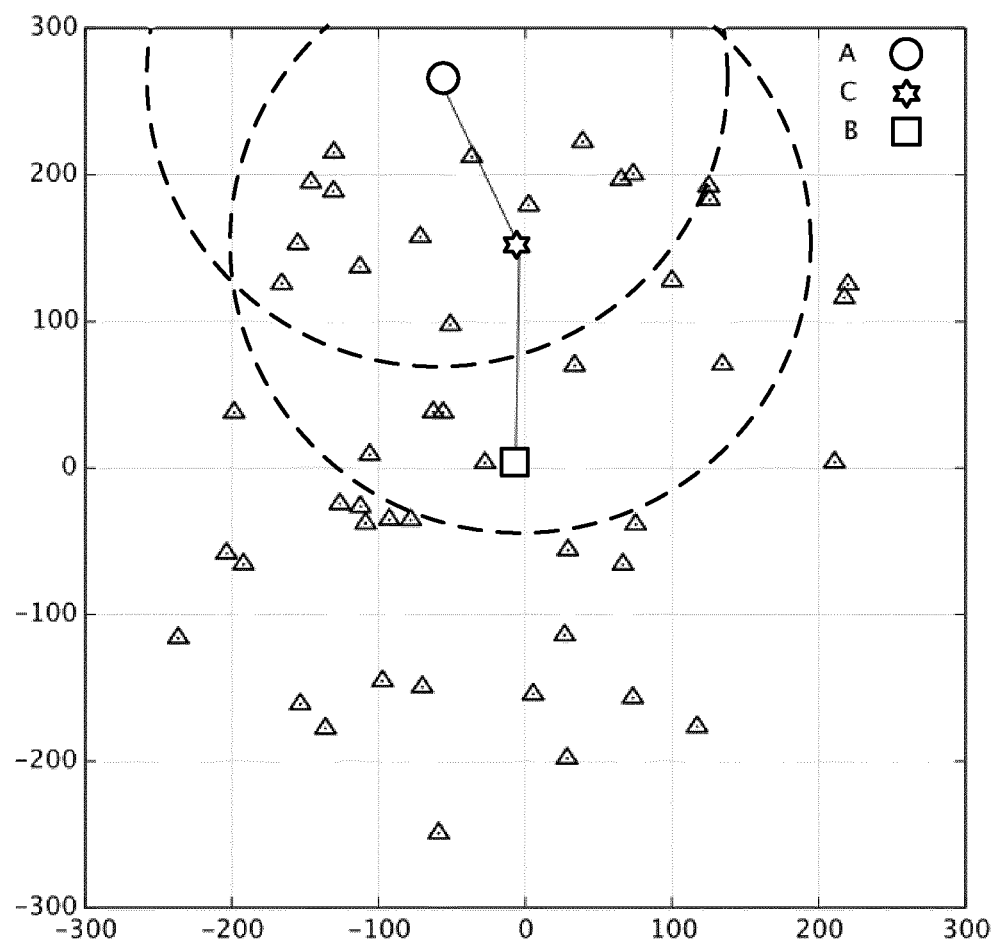
FIG. 5 illustrates reduced power and interference for transmission from a first node to a second node using an aggregation node.

By relaying the transmission, interference and power consumption may be reduced. FIG. 5 illustrates an alternative transmission path for the scenario disclosed in FIG. 2. By splitting the transmission into two parts, the power amplifiers of the transmitter in node A above does not operate above the "knee point". Furthermore, by using an aggregation node C the interference may be reduced, which is illustrated by the dashed line. In a contention based system, this may imply that the number of collisions are reduced, which in turn leads to further reduced power consumption.

According to one aspect, the disclosure refers to transmission methods and principles for nodes supporting at least two radio access technologies, RAT, the first RAT may use licensed frequency bands (3GPP) and technologies (LTE/HSPA/GPRS/EDGE), while the second RAT may use unlicensed frequency bands (ISM) and unlicensed technologies (Wi-Fi, Bluetooth). According to one aspect, the direct link 101 uses a first radio access technology and wherein nodes in the second set uses a second radio access technology which is different from the first radio access technology. This aspect implies that if the direct connection between the first and the second node is considered to have a too high energy cost, then alternatives in other RAT:s are investigated. Imagine e.g. a smartphone communicating over LTE. When the smartphone is located far away from a base station, in LTE named eNodeB, the smartphone will investigate if it would be possible to access e.g. the LTE network via a multihop connection using e.g. WLAN instead. Such an alternative connection may comprise one or several relaying nodes.

Another example is a capillary network of sensors having both short range and cellular communication means. Then the sensor data may be distributed to a remote server in a fashion which is favourable for the whole system.

Hence one example is that first RAT uses a coordinated transmission scheme e.g. LTE, HSPA, GPRS/EDGE. Another example is that second RAT uses a contention based transmission scheme e.g. Bluetooth or Wi-Fi.

According to one example embodiment, the second power metric, P2, associated with an aggregation node in the first set is the total output power needed or the total energy needed for at least the first node and the aggregation node, for transmitting the data packet to the second node via the aggregation node. For example, P2 is power/energy for the first node only. Hence, the second power metric is the total power needed for the first and second node in the route. This simple approach implies that power required by remote nodes is not considered.

According to one example embodiment, the second power metric, P2, associated with an aggregation node is the total output power needed or the total energy needed for all nodes comprised in the path between the first node and the second node when transmitting the data packet to the second node via the aggregation node. In contrast to the previous example, the second power metric is the total power needed for the entire route. This may e.g. be a recursive implementation, wherein each node comprises a routing table stating the power required to route the packet to different destinations. By adding the power required for the transmission from the first node to the aggregation node to the power required for transmitting the packet from the aggregation node to the destination, the total power may be obtained.

In some situations two adjacent nodes 10b, 10d within reach of node 10a, for both, node 10a need substantially the same low energy to transmit the data (i.e. below the "knee point"@45 dB in FIG. 1). Then the step of selecting a transmission path S4 may be based on further parameters as will be described in the following example embodiments, which may be implemented singly or in any combination.

According to one example embodiment, the step of selecting a transmission path S4 further comprises only selecting transmission paths wherein each node in the transmission path are positioned beyond a minimum distance from all other nodes in the transmission path. The purpose of such an implementation is that very short sub links are avoided. Turning back to FIG. 1, as stated above, the preferable area is between the dashed lines L1 and L2. Only selecting transmission paths wherein each node in the transmission path is positioned beyond a minimum distance implies that operation below the lower limit L1 is avoided. Hence, it is not always preferable to select the closest link. This could also be expressed as only selecting paths wherein the first or second power metric, P1, P2, is above a first power level.

In another example a node is chosen giving the lowest number of hops to the gateway node, but still the transmission power from the first node is sufficiently low. According to this example embodiment, the step of selecting a transmission path S4 further comprises determining a number of aggregation nodes in a transmission path from the first to the second node and selecting a transmission path based on the number of links in the transmission path. Paths comprising many aggregation nodes, i.e. intermediate nodes between source and destination may cause delays due to cues or transmission delays. Hence, this step may imply selecting paths comprising a limited number of nodes. Hence, the disclosure covers the case that node 10d is chosen, in the example of FIG. 3, even if node 10c is closer to node 10a, but still the transmit power for transmission to node 10d is sufficiently low, i.e. below the "knee point".

According to one example embodiment, the packet is transmitted to the node with most packets in the buffer, implying data soon to be transmitted further to the gateway node. The method of sending a data packet then further comprises, for each aggregation node in the first set, determining S35 the number of data packets in at least one transmission buffer associated with transmitting the data packet to from the first node to the second node via the aggregation node. The selection S4 of a transmission path is further based on the determined number or numbers of data packets. The idea is that if there are several alternatives, the choice may be done by determination of which of the nodes having most data in the transmission buffer. Hence, it is likely that this node should soon transmit the data further to the gateway node and therefore more efficient (both from time and power perspective) to forward the data to that node. Information about buffer status may be received form broadcast signaling or from earlier communication, for instance from ACK signaling in response for earlier transmitted packets. Information about buffer status may be received form broadcast signaling or from earlier communication, for instance from ACK signaling in response for earlier transmitted packets.

In yet another example, the total transmission energy for the first and second (and possible more involved nodes) are used to determine the most suitable target node. Once the target node is determined, the metric for that node is determined, say P2.

Figure 6:
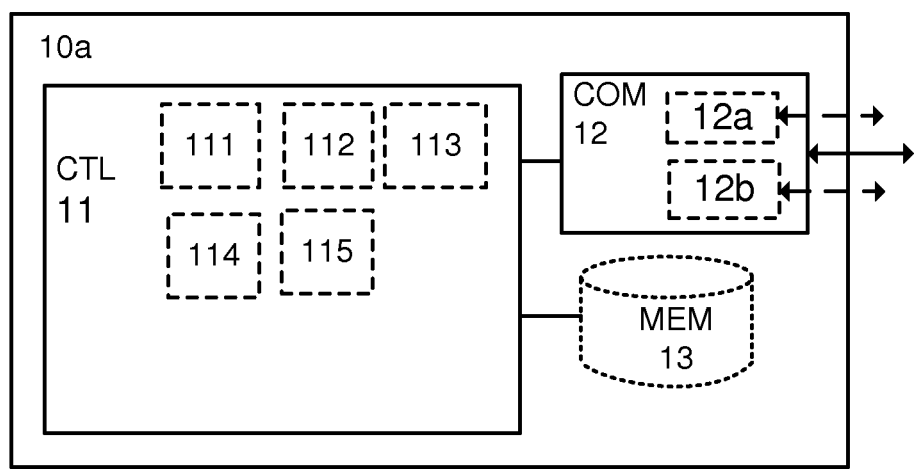
FIG. 6 is a schematic diagram illustrating a first node configured for sending a data packet from the first node to a second node.

Turning now to FIG. 6, a schematic diagram illustrating some modules of an exemplary embodiment of a first node 10a being configured for sending a data packet from the first node 10a to a second node 20, wherein there is a direct link from the first node to the second node, will be described. In this application the term node is generally used. The node is any node in the wireless communication network, e.g. a smartphone or a machine type device with wireless communication capabilities.

The node 10a comprises a controller, CTL, or a processing circuitry 11 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory.

The node 10a further comprises a communication interface (i/f), 12. The communication interface is arranged for wireless communication with other nodes 20 within range of the node. The communication interface may be adapted to communicate over one or several radio access technologies. If several technologies are supported, the node typically comprises several communication interfaces, e.g. one WLAN or Bluetooth communication interface 12a and one cellular communication interface 12b.

When the above-mentioned computer program code is run in the processing circuitry 11 of the node 10a, it causes the node 10a to determine a first power metric, P1, associated with transmitting the data packet from the first node to the second node on the direct link. When the determined first power metric, P1, is above a first power level L1, then the node 10a is caused to determine a first set of aggregation nodes 10b-d, being within reach of the first node 10a, wherein each aggregation node in the set comprised in a respective alternative transmission path from the first node 10a to the second node 20. The node is further caused to, for each aggregation node 10b, 10c, 10d in the first set determine S3 a second power metric, P2, associated with transmitting the data packet from the first node to the second node via the aggregation node 10b, 10c, 10d and select S4 a transmission path for sending the data packet from the first node to the second node based on a comparison of the first power metric, P1, and the second power metric(s), P2. Finally the node is configured to send S5 the packet on the selected transmission path.

According to one aspect, the communication interface 12 is further adapted to communicate directly with the second node 10a using a first radio access technology and to communicate with the aggregation nodes 10b, 10c, 10d of the second set of nodes using a second radio access technology which is different from the first radio access technology.

According to one aspect of the disclosure the controller comprises one or several of:
  a first determiner 111 configured to determine a first power metric, P1, associated with transmitting the data packet from the first node to the second node on the direct link,
  a second determiner 112 configured to, when the determined first power metric, P1, is above a first power level, L1, then determine a first set of aggregation nodes (10), being within reach of the first node 10a, wherein each aggregation node in the set is comprised in a respective alternative transmission path from the first node (10a) to the second node 20,
  a third determiner 113 configured to, for each aggregation node 10 in the first set determine a second power metric, P2, associated with transmitting the data packet to from the first node to the second node via the aggregation node 10,
  a selector 114 configured to select a transmission path for sending the data packet from the first node to the second node based on a comparison of the first power metric, P1, and the second power metric(s), P2, and
  a sending module 115 configured to send the packet on the selected transmission path.

The first, second and third determiner 111, 112, 113, the selector 114 and the sending module 115 are implemented in hardware or in software or in a combination thereof. The modules 111, 112, 113, 114, 115 are according to one aspect implemented as a computer program stored in a memory 13 which run on the processor 11. The node 10a is further configured to implement all the aspects of the disclosure as described in relation to the methods above.

According to one aspect the disclosure further relates to the above mentioned computer program, comprising computer readable code which, when run on an node in a contention based communication system, causes the node to perform any of the aspects of the method described above.

The invention claimed is:

1. A method, performed in a first node in a wireless network comprising a number of nodes wirelessly connected to each other, of sending a data packet from the first node to a second node, wherein there is a direct link to the second node from the first node, the method comprising:
  determining a first power metric, P1, associated with transmitting the data packet from the first node to the second node on the direct link, wherein the direct link uses a first radio access technology;
  when the determined first power metric, P1, is above a first power level, then determining a first set of aggregation nodes, being within reach of the first node, wherein each aggregation node in the set is comprised in a respective alternative transmission path from the first node to the second node and wherein nodes in the first set use a second radio access technology which is different from the first radio access technology;

for each aggregation node in the first set determining a second power metric, P2, associated with transmitting the data packet from the first node to the second node via the aggregation node, selecting a transmission path for sending the data packet from the first node to the second node based on a comparison of the first power metric, and the second power metric(s), sending the packet on the selected transmission path;

for each aggregation node in the first set determining a number of data packets in at least one transmission buffer, in the aggregation node, associated with transmitting the data packet from the first node to the second node via aggregation node; and wherein the selection of a transmission path is further based on the determined number of data packets in the transmission buffers, of the aggregation nodes, associated with transmitting the data packet from the first node to the second node.

2. The method of sending a data packet according to claim 1 wherein the first radio access technology uses a coordinated transmission scheme.

3. The method of sending a data packet according to claim 2, wherein the
first radio access technology is one of LTE, HSPA, GPRS/EDGE.

4. The method of sending a data packet according to claim 1, wherein the second radio access technology uses a contention based transmission scheme.

5. The method of sending a data packet according to claim 1, wherein the second radio access technology is Bluetooth or Wi-Fi.

6. The method of sending a data packet according to claim 1, wherein the first or second power metric is output power or total energy needed for the first or second node, respectively, to transmit the data packet.

7. The method of sending a data packet according to claim 1, wherein the second power metric, associated with an aggregation node in the first set is total output power needed or the total energy needed for at least the first node and the aggregation node, for transmitting the data packet to the second node via the aggregation node.

8. The method of sending a data packet according to claim 1, wherein the second power metric, associated with an aggregation node in the first set is the total output power needed or the total energy needed for the aggregation node, for transmitting the data packet to the second node via the aggregation node.

9. The method of sending a data packet according to claim 1, wherein the second power metric, associated with an aggregation node is total output power needed or the total energy needed for all nodes comprised in the path between the first node and the second node when transmitting the data packet to the second node via the aggregation node.

10. The method of sending a data packet according to claim 1, wherein the step of selecting a transmission path further comprises only selecting transmission paths wherein each node in the transmission path are positioned beyond a minimum distance from all other nodes in the transmission path.

11. The method of sending a data packet according to claim 1, wherein the step of selecting a transmission path further comprises determining a number of aggregation nodes in a transmission path from the first to the second node and selecting a transmission path based on a number of links in the transmission path.

12. The method of sending a data packet according to claim 1, wherein first power level corresponds to a "knee point" of a transmission power for a power amplifier, below which knee point a relationship between power needed for transmission and amplification level is flat.

13. The method of sending a data packet according to claim 1, wherein the selected transmission includes an aggregation node from the first set having the most data in its transmission buffer associated with transmitting the data packet from the first node to the second node.

14. A first node in a wireless network comprising a number of nodes wirelessly connected to each other, configured for sending a data packet from the first node to a second node, wherein there is a direct link to the second node from the first node, the first node comprising:

a communication interface configured for wireless communication with other nodes in the wireless network, and being adaptable to communicate directly with the second node using a first radio access technology and to communicate with aggregation nodes of a first set of nodes using a second radio access technology which is different from the first radio access technology; and processing circuitry, configured to:
i. determine a first power metric, associated with transmitting the data packet from the first node to the second node on the direct link, wherein the direct link uses a first radio access technology,
ii. when the determined first power metric, is above a first power level, then determine a first set of aggregation nodes, being within reach of the first node, wherein each aggregation node in the set comprised in a respective alternative transmission path from the first node to the second node and wherein nodes in the first set uses a second radio access technology which is different from the first radio access technology,
iii. for each aggregation node in the first set determine a second power metric, associated with transmitting the data packet from the first node to the second node via the aggregation node,
iv. select a transmission path for sending the data packet from the first node to the second node based on a comparison of the first power metric, and the second power metric(s),
v. end the packet on the selected transmission path; and
vi. for each aggregation node in the first set determining a number of data packets in at least one transmission buffer, in the aggregation node, associated with transmitting the data packet from the first node to the second node via aggregation node; and
wherein the selection of a transmission path is further based on the determined number of data packets in the transmission buffers, of the aggregation nodes, associated with transmitting the data packet from the first node to the second node.

15. The node of claim 14, wherein the selected transmission includes an aggregation node from the first set having the most data in its transmission buffer associated with transmitting the data packet from the first node to the second node.

16. A nontransitory computer readable storage medium comprising computer readable code which, when run on a first node in a contention based communication system, causes the first node to perform a method of sending a data packet from the first node to a second node, wherein there is a direct link to the second node from the first node, the method comprising:

determining a first power metric associated with transmitting the data packet from the first node to the second node on the direct link, wherein the direct link uses a first radio access technology, when the determined first power metric is above a first power level, then determining a first set of aggregation nodes, being within reach of the first node, wherein each aggregation node in the set is comprised in a respective alternative transmission path from the first node to the second node and wherein nodes in the first set use a second radio access technology which is different from the first radio access technology, for each aggregation node in the first set determining a second power metric associated with transmitting the data packet from the first node to the second node via the aggregation node, selecting a transmission path for sending the data packet from the first node to the second node based on a comparison of the first power metric and the second power metric(s), sending the packet on the selected transmission path;

for each aggregation node in the first set, determining a number of data packets in at least one transmission buffer, in the aggregation node, associated with transmitting the data packet from the first node to the second node via the aggregation node; and wherein the selection of a transmission path is further based on the determined number of data packets in the transmission buffers, of the aggregation nodes, associated with transmitting the data packet from the first node to the second node.

17. The computer readable storage medium of claim 16, wherein the selected transmission includes an aggregation node from the first set having the most data in its transmission buffer associated with transmitting the data packet from the first node to the second node.

* * * * *